United States Patent [19]

Mueller

[11] Patent Number: 5,564,468
[45] Date of Patent: Oct. 15, 1996

[54] SEAT-STYLE PRESSURE-RELIEF VALVE

[75] Inventor: Martin Mueller, Moeglingen, Germany

[73] Assignee: Robert Bosch GmbH, Stuttgart, Germany

[21] Appl. No.: 232,299

[22] PCT Filed: Aug. 9, 1992

[86] PCT No.: PCT/DE92/00757

§ 371 Date: Aug. 25, 1994

§ 102(e) Date: Aug. 25, 1994

[87] PCT Pub. No.: WO93/10386

PCT Pub. Date: May 27, 1993

[30] Foreign Application Priority Data

Nov. 11, 1991 [DE] Germany .......................... 36 13 683.2

[51] Int. Cl.[6] .................................................. F16K 15/04
[52] U.S. Cl. ............................ 137/539; 137/529; 137/903
[58] Field of Search ................................. 137/859, 539.5, 137/903, 529

[56] References Cited

U.S. PATENT DOCUMENTS

| | | | |
|---|---|---|---|
| 3,079,946 | 3/1963 | Rosler | 137/859 X |
| 3,105,507 | 10/1963 | Dunmire | 137/359 X |
| 3,528,342 | 9/1970 | Simcock | 137/859 X |
| 3,807,430 | 4/1974 | Keller | 137/859 X |
| 4,593,720 | 6/1986 | Bergandy | 137/859 |
| 4,852,605 | 8/1989 | Gouhier | 137/859 X |

FOREIGN PATENT DOCUMENTS

| | | | |
|---|---|---|---|
| 67179 | 2/1892 | Germany | 137/859 |
| 3307242 | 6/1984 | Germany . | |
| 3405840 | 8/1985 | Germany . | |
| 3613683 | 5/1987 | Germany . | |
| 690897 | 4/1953 | United Kingdom . | |

*Primary Examiner*—John Rivell
*Attorney, Agent, or Firm*—Michael J. Striker

[57] ABSTRACT

The pressure-relief valve (10) has a valve member (18), which interacts with a valve seat (17). The valve member (18) is forced with a certain pretensioning against the valve seat, which pretensioning is applied by way of a diaphragm (21), either directly by this or by virtue of an additional spring means. Whenever a predefined maximum pressure is exceeded, the diaphragm (21) comes to bear against a stop face (26). Due to the free guidance of the valve member (18) tight, contamination-sensitive gaps are avoided. Although the pressure-relief valve is compact, secure bearing contact of the valve member against the seat is nevertheless ensured (FIG. 1).

5 Claims, 2 Drawing Sheets

SEAT-STYLE PRESSURE-RELIEF VALVE

PRIOR ART

The invention is based upon a seat-style pressure-relief valve according to the generic type of the main claim. Known pressure-relief valves of this type are used where high requirements are placed upon low contamination-sensitivity, small regulating paths and short response times. Especially where the contamination-insensitivity requirements are high, i.e. where pressure-relief valves of this type are used in contaminated pressure-medium circuits, it is endeavoured to dispense with any tight guidance of the valve member. However, in known pressure-relief valves, this then leads to a tendency for their valve members to jam. Also the requirements of a good bearing contact of the valve member against the valve seat (seal-tightness) do not always, in this case, satisfy all demands.

ADVANTAGES OF THE INVENTION

The seat-style pressure-relief valve according to the invention, having the characterizing features of the main claim, has the advantage in contrast to the above that, despite low contamination-sensitivity, a good and secure bearing contact of the valve member against the valve seat is ensured. The pressure-relief valve according to the invention, moreover, displays no tendency to jam and is distinguished by a simple and compact construction.

Further advantages and advantageous refinements of the invention can be derived from the subclaims and the description.

DRAWING

Illustrative embodiments of the invention are explained in greater detail in the following description and drawing. The latter shows in FIG. 1, in section, a first illustrative embodiment of a pressure-relief valve according to the invention, which is inserted in a diagrammatically represented hydraulic regulating device.

DESCRIPTION OF THE ILLUSTRATIVE EMBODIMENTS

Figure 1:
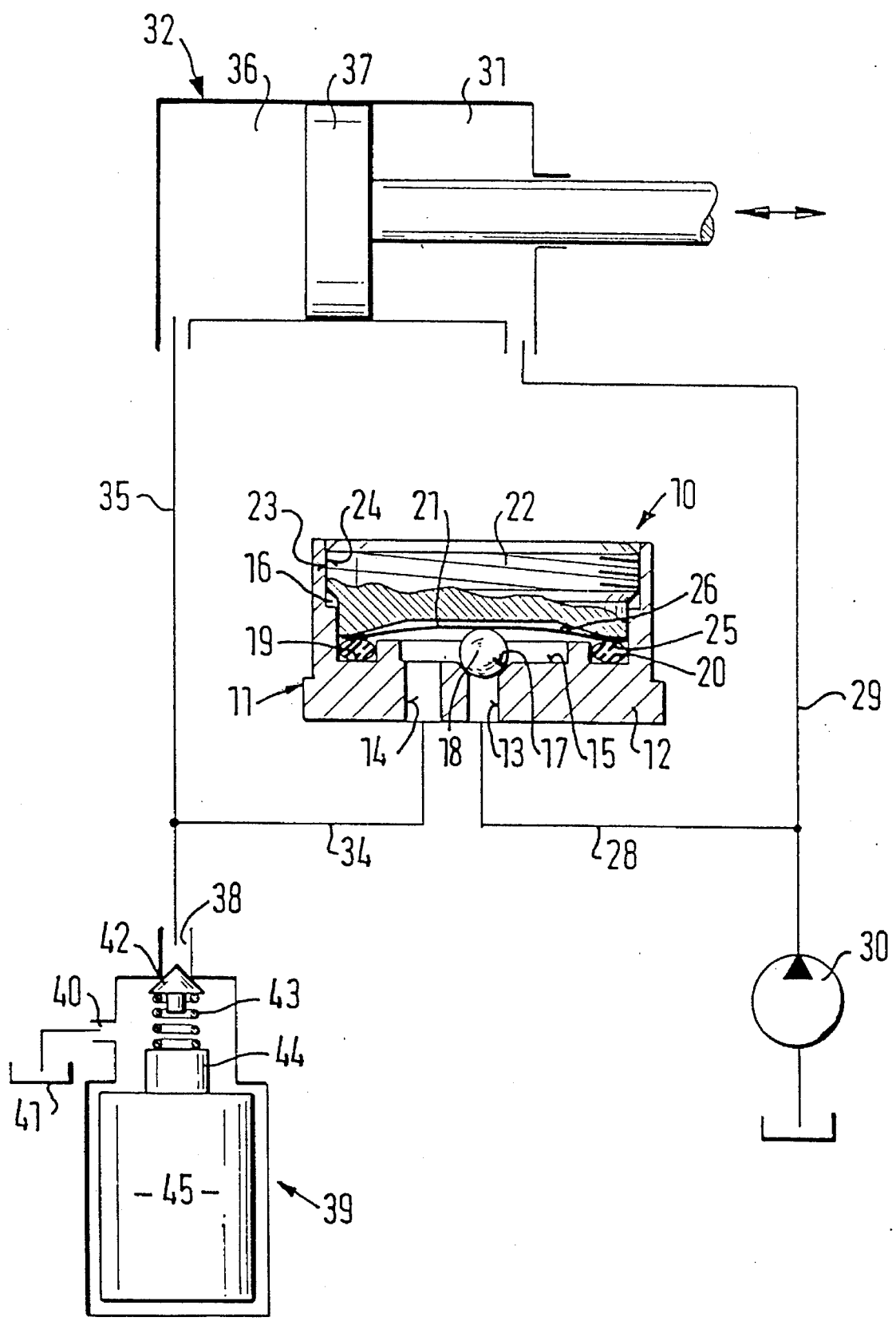

The pressure-relief valve 10 represented in FIG. 1 has an approximately pot-shaped housing 11, the base 12 of which is penetrated by a centric bore 13 and an eccentric bore 14. These bores open out into a recess 15 which, originating from the interior 16 of the housing 11, is sunk into the base 12.

The centric bore 13 is widened conically in the direction of the recess 15. This widening serves as a valve seat 17 and interacts with a valve member 18 which, in this illustrative example, is constructed as a ball.

Into the base 12 of the housing 11 there is further sunk an annular groove 19, which originates from the interior 16 and into which there is placed a sealing ring 20. The external diameter of the annular groove 19 corresponds to the diameter of the interior 16 and the said annular groove runs concentrically to the recess 15. Bearing with its rim upon the sealing ring 20 is a disc-shaped diaphragm 21, which also bears upon the valve member 18.

The housing 11 is closed off by a housing cover 22 and, at the same time, the diaphragm 21 is pressed against the sealing ring 20. For this purpose, the housing cover 22 is constructed approximately cylindrically and is screwed by an external thread 23 into a corresponding internal thread 24 of the housing 11.

Into that end side 25 of the housing cover 22 facing the base 12 there is sunk an approximately frusto-conical recess 26, the external diameter of which is somewhat greater than the internal diameter of the annular groove 19.

The centric bore 13 in the housing 11 is connected to a line 28 which branches off from a pressure line 29. Through this pressure line 29, pressure medium is delivered by a pump 30 into the annular chamber 31 of a differential cylinder 32.

The eccentric bore 14 is connected to a line 34 which branches off from a pressure line 35. This connects the larger pressure chamber 36 on the differential piston 37 of the differential cylinder 32 to the inlet 38 of an electromagnetically operated proportional pressure control valve 39, the outlet 40 of which is connected to a receptacle 41. The said proportional pressure control valve exhibits a valve member 42, which is loaded in the direction of closing by a spring 43 supported against a tappet 44 of the electromagnet 45 of the proportional pressure control valve 39.

A hydraulic regulating device of this type is described in Patent Application P 41 28 656.1 and serves to actuate a device for adjusting the camshaft of a motor vehicle relative to its crankshaft.

For an adjustment of the differential piston 37 to the left (FIG. 1), the proportional pressure control valve 39 is depressurized. The pressure chamber 36 of the differential chamber 32 is also therefore pressureless, i.e. the spring 43, when the electromagnet 45 is not excited, is not or only very slightly pretensioned. Even very low pressures at the inlet 38 are hence able to move the valve member 42 in the direction of opening. In the annular chamber 31 of the differential cylinder 32 there can develop, via the pressure line 29, a pressure generated by the pump 30. This pressure is dependent upon the pressure set at the pressure-relief valve 10. Appropriate screw-tightening of the housing cover 22 enables the diaphragm 21 to be pretensioned, so that a specific closing force acts upon the valve member 18. If the pressure in the line 28 exceeds a specific value, so that the force, generated by this pressure, upon the valve member 18 is greater than the closing force generated by the pretensioned diaphragm 21, the valve member 18 is raised from its valve seat 17. Pressure medium is thereby able to make its way from the line 28 through the bore 13, past the open valve seat 17, into the interior 16. Via the bore 14 and the line 34, a connection then exists to the pressure line 35 or to the depressurized proportional pressure control valve.

If, by appropriate screw-tightening of the housing cover 22 and by prior coordination of the diaphragm dimensions, the opening pressure of the valve diaphragm 18 is set to about 30 bar, this pressure, due to the action of the pump 30, also develops in the annular chamber 31, so that the differential piston 37 is adjusted to the left.

For an adjusting movement of the differential piston 37 to the right, the opening pressure of the proportional pressure control valve 39 is set to about 70 bar. The electromagnet 45 of the proportional pressure control valve 39 is then flowed through by a current of specific strength, so that the spring 43 is pretensioned. The pretensioning of the spring 43 is then sufficient to allow the valve member 43, only once a pressure of about 70 bar is reached at the inlet 38, to be moved in the direction of opening. The pretensioning and the dimensions of the diaphragm 21 of the pressure-relief valve 10 are chosen such that the diaphragm 21 bears against the housing cover 22 or the recess 26 whenever the pressure in the interior 16 or in the bore 14 is greater than about 10 bar. The pressure-relief function is thus suspended. There is therefore virtually free passage through the pressure-relief valve, so that equal pressure obtains in the pressure chamber 36 and in the annular chamber 31. As a result of the larger effective surface of the differential piston 37 on the side facing the pressure chamber 36, the said differential piston is moved to the right.

Should the differential piston 37 be held in a stationary position against a leftward-directed force fed back from the camshaft-adjusting device, the proportional pressure control valve 39 is set to an opening pressure of about 20 bar. This pressure is then able to develop in the pressure chamber 36 and in the annular chamber 31, since, as previously described, the pressure-relief function of the pressure-relief valve 10 is suspended whenever there is a pressure on the discharge side of more than 10 bar. The developing pressure in the annular chamber 31 enables the leftward-directed force upon the differential piston 37 to be counterbalanced.

If the dimensions of the interior 16, valve seat diameter, diaphragm surface area and thickness are predefined, then the pressure-relief valve 10 can be pretensioned by appropriate screw-tightening of the housing cover 22. That side of the diaphragm 21 facing the valve member 18 is acted upon by pressure medium. The opposite side is connected, by the gap between the housing cover 22 and housing 11, to the ambient pressure. The clamping of the diaphragm 21 between the housing cover 22 and annular seal 20 prevents any loss of pressure medium. The fact that the diaphragm bears against the housing cover 22 whenever a specific maximum pressure in the inflow 13 is exceeded, and also whenever a predefined pressure in the outflow 14 is exceeded, enables the pressure-relief valve to be made in very short and compact construction. The valve member 18 is guided relatively freely, so that no contamination-sensitive guide gaps are necessary. Nevertheless, given suitable dimensions of the valve seat 17, valve member 18 and valve member path, a secure bearing contact of the valve member against the seat is ensured.

Figure 2:
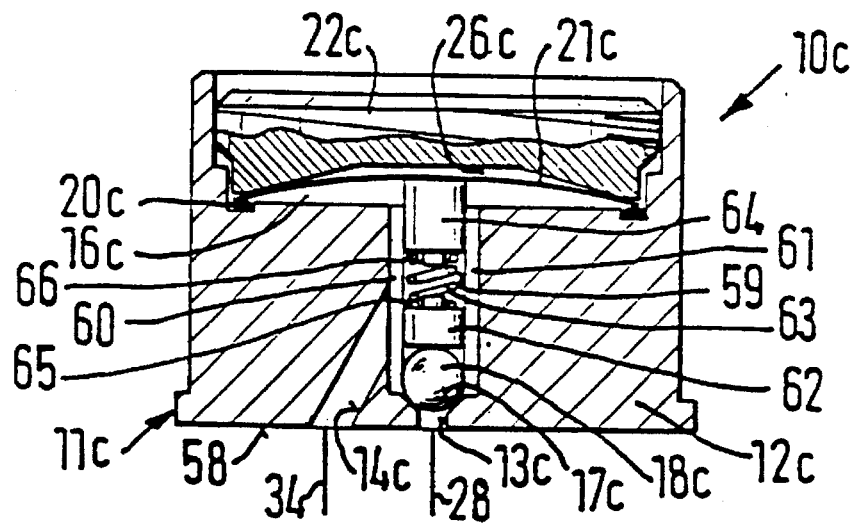
FIG. 2 shows another embodiment of the invention.
Figure 2A:
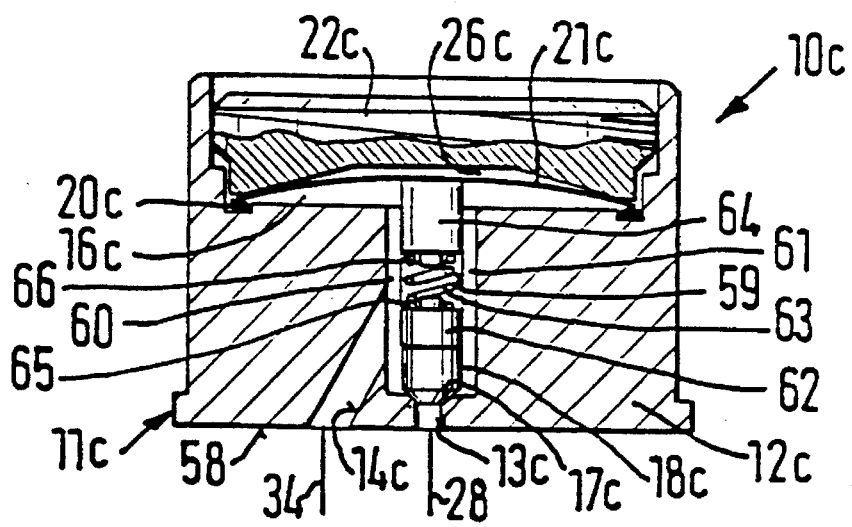
FIG. 2A is a view showing a further embodiment of the present invention.

In a modification of the above-described illustrative embodiment, it is also possible for the valve member 18 to be cylindrically constructed and for the end face interacting with the valve seat 17 to be conically shaped as shown in FIG. 2A.

In the second illustrative embodiment according to FIG. 2, there is formed in the base 12c of the housing 11c a centric stepped bore 13c originating from the interior 16c. That step of the stepped bore 13c which is located close to the bottom side 58 of the housing is conical and serves as a valve seat 17c.

Next to the larger segment 59 of the stepped bore 13c, which larger segment runs above the valve seat 17c, there are two longitudinal slots 60, 61 running parallel to the said stepped bore. The two longitudinal slots 60, 61 lie opposite each other and are respectively connected, over their entire length, to the segment 59 of the stepped bore 13c.

Opening out into the longitudinal slot 60 and thus into the segment 59 of the stepped bore 13c, above the valve seat 17c, is the obliquely running bore 14c. The bore 14c originates from the bottom side 58 of the housing 11c and is connected to the line 34.

Inserted in the segment 59 of the stepped bore 13c, lying one behind the other, are the conical valve member 18c, a first guide piston 62, a compression spring 63 and a second guide piston 64.

The spherical valve member 18c bears against the valve seat 17c. On the opposite side, the first guide piston 62 bears against the valve member. On the opposite end side 65 of the first guide piston 62 there is supported the one end of the compression spring 63, the other end of which bears against the end side 66 of the second guide piston 64.

The second guide piston 64 juts right into the interior 16c of the housing 11c. It there interacts with the diaphragm 21c, the rim of which bears upon the sealing ring 20c. The housing 11c is also sealed off by a housing cover 22c having a frustoconical recess 26c.

The guide pistons 62 and 64 are not required to fulfil any sealing functions whatsoever and so their guidance in the segment 59 of the stepped bore 13c can be effected by way of relatively large annular gaps (no tight, contamination-sensitive fits).

The diaphragm 21c—as in the first illustrative embodiments—is pretensioned by appropriate screw-tightening of the housing cover 22c.

This configuration of the pressure-relief valve enables the effect of the pressure in the line 34 (discharge pressure) upon the closing action of the valve member 18c to be adjusted. Pressure in the line 34 also exerts an influence, via the longitudinal slots 60, 61 and the segment 59 of the stepped bore 13c, in the interior 16c. As a result of this pressure, the diaphragm 21c is arched in the direction of the housing cover 22c. This enables the compression spring 63 to lengthen, so that its pretensioning declines and the closing force acting upon the valve member 18c diminishes.

By suitable dimensioning of the effective pressure surface A on the valve member 18c (A in $m^2$), of the spring rigidity c of the compression spring 63 (c in N/m) and of the diaphragm rigidity or diaphragm sag K of the diaphragm 21c (K in m/Pa), the closing force acting upon the valve member can be influenced in dependence upon the discharge pressure.

If the effective pressure surface A, the spring rigidity c and the diaphragm rigidity K are chosen such that K is equal to the quotient of A and c (K=A/c), there is no feedback of discharge pressure onto the closing force of the ball. Given this dimensioning, the declining closing force resulting from the lengthening of the spring 63 and the increase in closing force resulting from the increase in discharge pressure are held in equilibrium.

Where the pressure-relief valve 10c is used in a hydraulic regulating device for adjusting the camshaft of a motor vehicle, energy advantages are obtained if pressure in the outflow produces a reduction in the piston-closing force. This is achieved if the diaphragm rigidity K is less than the quotient of the effective pressure surface A and the spring rigidity c of the compression spring 63 (K<A/c).

Correspondingly, an increase in closing force can also be achieved by appropriate dimensioning (K>A/c).

I claim:

1. A pressure-relief seat valve, comprising means forming an inflow and an outflow; a spring-loaded valve member preventing a pressure medium current from said outflow to said inflow and releasing the pressure medium current from said inflow to said outflow when a predetermined pressure is exceeded; a diaphragm cooperating with said valve member and having a rim which is clamped, said diaphragm forming spring means; an adjustable stop face against which said diaphragm bears when the predetermined maximum pressure is exceeded; a sealing ring against which said diaphragm bears in a region of a clamping point; and adjusting means for altering a pretensioning of said diaphragm.

2. A pressure-relief seat valve as defined in claim 1, wherein said valve member is formed as a ball valve member.

3. A pressure-relief seat valve as defined in claim 1, wherein said valve member has at least a portion which is conical.

4. A pressure-relief seat valve as defined in claim 1, wherein said inflow, said outflow and said diaphragm are arranged so that a pressure in said inflow and a pressure in said outflow act upon said diaphragm on a same side.

5. A pressure-relief seat valve, comprising means forming an inflow and an outflow; a valve seat; a spring-loaded valve member preventing a pressure medium current from said outflow to said inflow and releasing the pressure medium current from said inflow to said outflow when a predetermined pressure is exceeded, said valve member being formed as a diaphragm, which is clamped at its rims; a stop face against which said diaphragm bears when the predetermined maximum pressure is exceeded; a sealing ring against which said diaphragm bears in a region of a clamping point; and spring means loading said diaphragm in direction toward said valve seat; and further comprising further spring means arranged between said diaphragm and said valve member.

* * * * *